United States Patent
Wu

(10) Patent No.: US 6,189,979 B1
(45) Date of Patent: Feb. 20, 2001

(54) WHEEL MOUNTING ARRANGEMENT FOR A GOLF CLUB CARRIER

(76) Inventor: David Wu, No. 35-1, Jih Hsin Street, Tu Cheng City, Taipei Hsien (TW)

( * ) Notice: Under 35 U.S.C. 154(b), the term of this patent shall be extended for 0 days.

(21) Appl. No.: 09/428,550

(22) Filed: Oct. 28, 1999

(51) Int. Cl.[7] .................................................. B60B 37/00
(52) U.S. Cl. ........................................... 301/111; 301/121
(58) Field of Search .................................... 301/111, 119, 301/120, 121, 124.2; 403/315, 320, 321, 322.4

(56) References Cited

U.S. PATENT DOCUMENTS

| | | | |
|---|---|---|---|
| 678,744 | * 7/1901 | Kinley | 301/121 |
| 4,978,175 | * 12/1990 | Wu | 301/111 X |
| 5,529,385 | * 6/1996 | Tsao | 301/121 X |
| 5,658,054 | * 8/1997 | Wu | 301/121 X |
| 5,947,795 | * 9/1999 | Cohen | 301/125 X |

* cited by examiner

Primary Examiner—Russell D. Stormer
(74) Attorney, Agent, or Firm—Varndell & Varndell, PLLC

(57) ABSTRACT

A wheel mounting arrangment, which includes a wheel shaft having a locating block at one end fitted into a locating hole on a leg at a golf club carrier, and lever turned about a pivot at the leg and engaged into a transverse positioning groove at the locating block of the wheel shaft to lock the wheel shaft, wherein the pivot is disposed in parallel to the wheel shaft, and the lever is turned about the pivot in direction perpendicular to the wheel shaft, the wheel shaft has two guide slopes at two opposite lateral sides of the transverse positioning grooves for guiding the locking block of the lever into the locking position; the locating hole of the leg has a diameter gradually increased toward the outside of the leg, and the locating block of the wheel shaft has an outer diameter fitting the diameter of the locating hole.

2 Claims, 6 Drawing Sheets

WHEEL MOUNTING ARRANGEMENT FOR A GOLF CLUB CARRIER

BACKGROUND AND SUMMARY OF THE INVENTION

The present invention relates to a wheel mounting arrangement for a golf club carrier, and more particularly to such a wheel mounting arrangement, which enables the wheel to be quickly and positively installed in the wheel shaft.

FIGS. 1 and 2 shows a wheel mounting structure according to U.S. Pat. No. 5,658,054. This wheel mounting structure comprises a wheel shaft fastened to a locating hole on the leg of a golf club carrier to hold a wheel, and a lever pivoted to the leg and turned to lock the wheel shaft. This wheel mounting structure is functional, however it still has minor drawbacks. Because the lever is pivotally coupled between the two downwardly extended side flanges of the leg in same axial direction of the shaft body of the wheel shaft, the lever may be forced to disengage from the wheel shaft when the golf club carrier is moved over an uneven land surface.

The present invention eliminates the aforesaid problem. According to the present invention, the wheel mounting arrangement of the present invention comprises a wheel shaft fastened to a locating hole on the leg of a golf club carrier to hold a wheel, and a lever pivoted to a pivot at the leg and turned to lock the wheel shaft, wherein the pivot is disposed in parallel to the wheel shaft, and the lever is turned about the Pivot in direction perpendicular to the wheel shaft. Because the lever is disposed perpendicular to the wheel shaft, it is firmly retained in the locking position when the golf club carrier moving over an unenen land surface. Further, the wheel shaft has two guide slopes at two opposite lateral sides of the transverse positioning grooves for guiding the locking block of the lever into the locking position.

DETAILED DESCRIPTION OF THE PREFERRED EMBODIMENT

Figure 1:
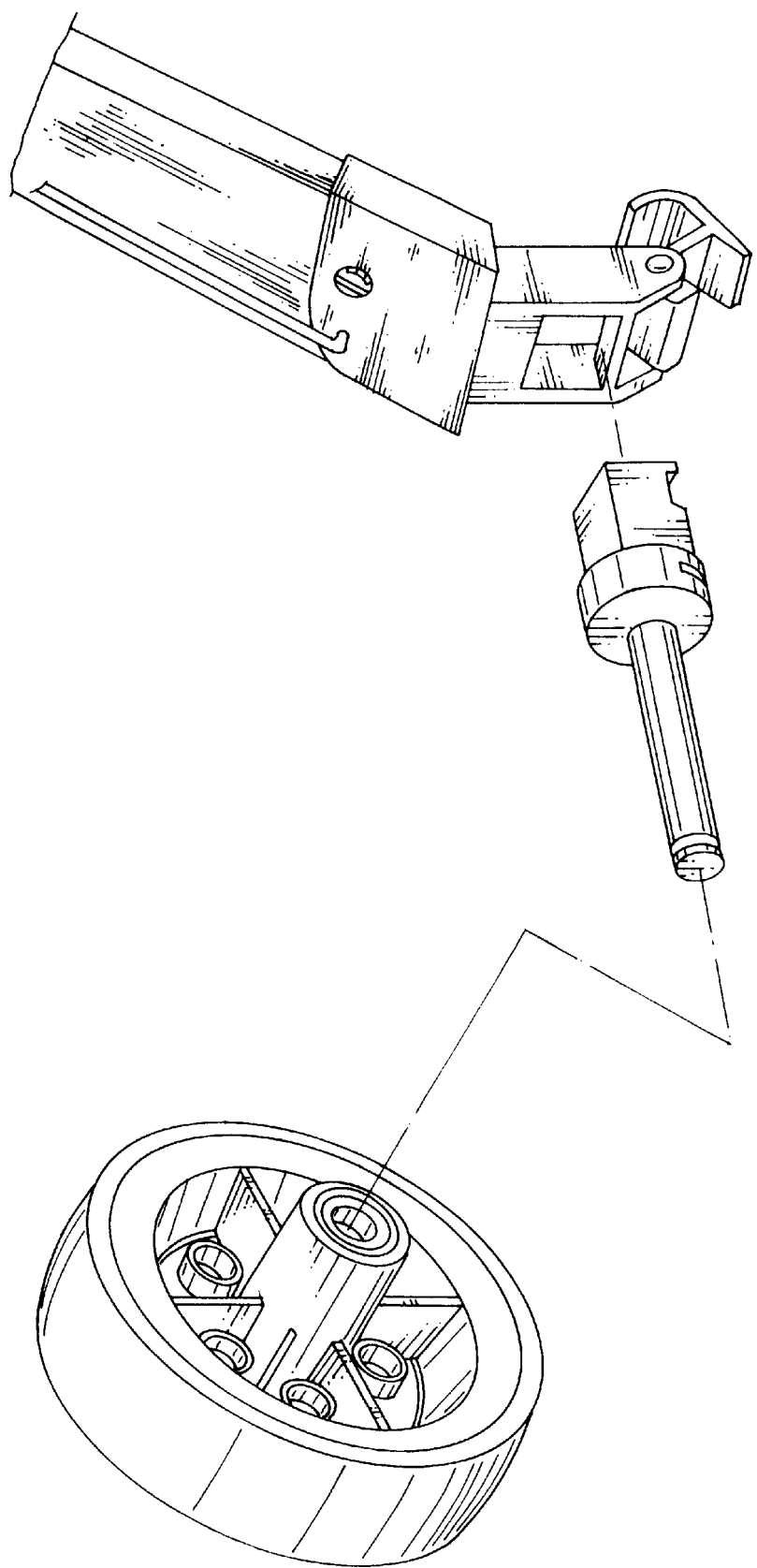
FIG. 1 is an exploded view of a wheel mounting structure according to U.S. Pat. No. 5,658,054.
Figure 2:
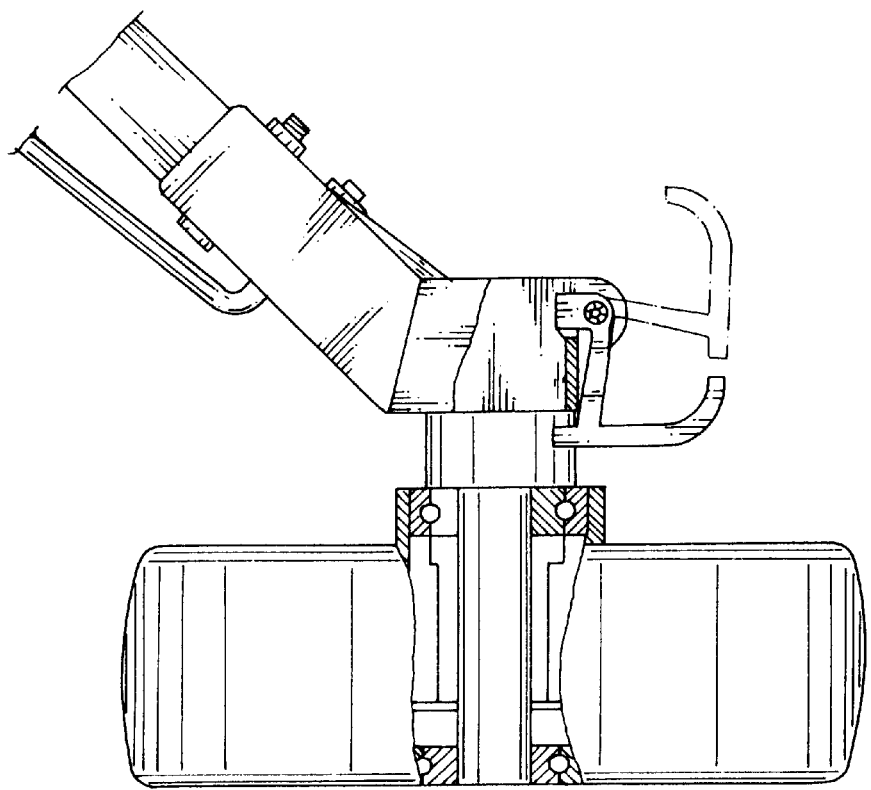
FIG. 2 is a sectional assembly view of FIG. 1.
Figure 3:
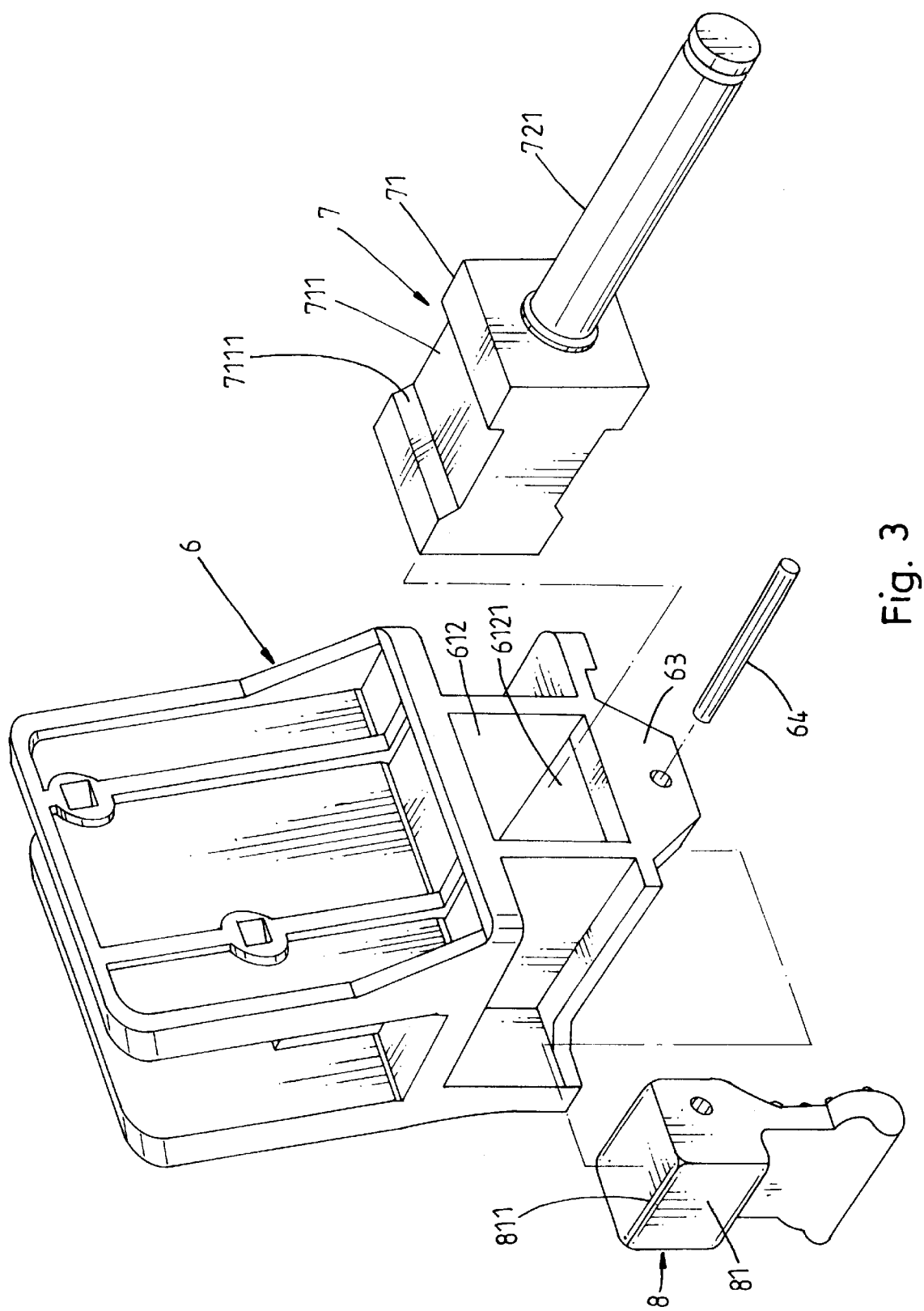
FIG. 3 is an exploded view of the present invention.
Figure 4:
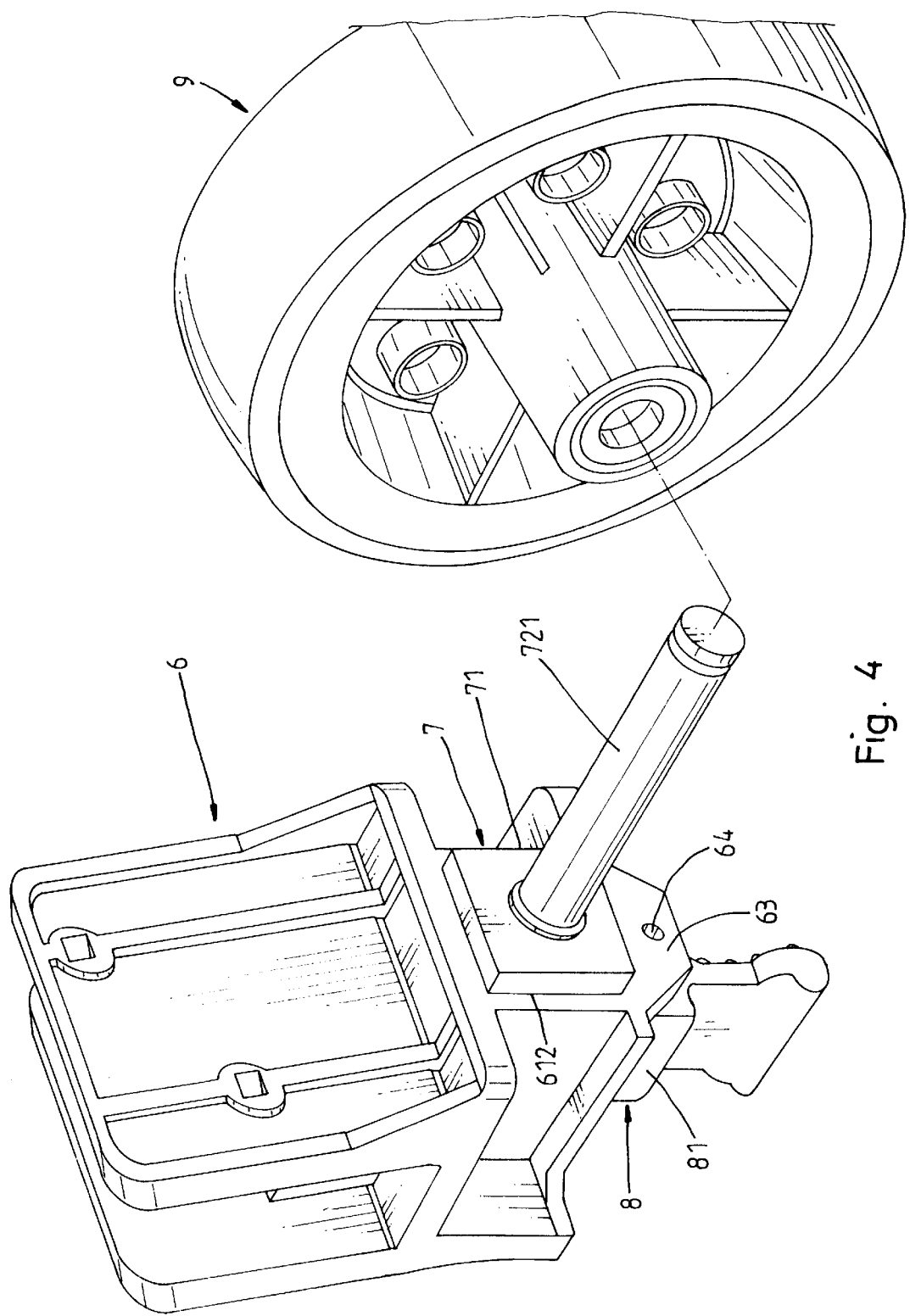
FIG. 4 is an assembly view of the present invention before the installation of the wheel.
Figure 5:
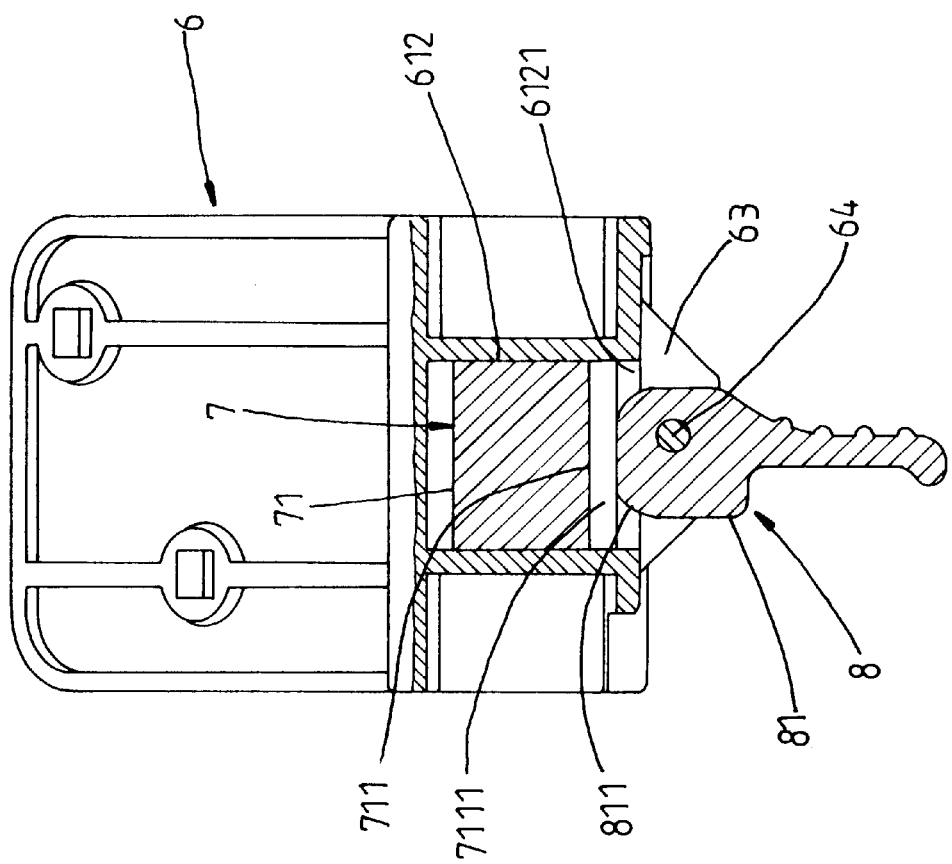
FIG. 5 is a sectional view of the present invention, showing the lever turned to the vertical unlocking Position.
Figure 6:
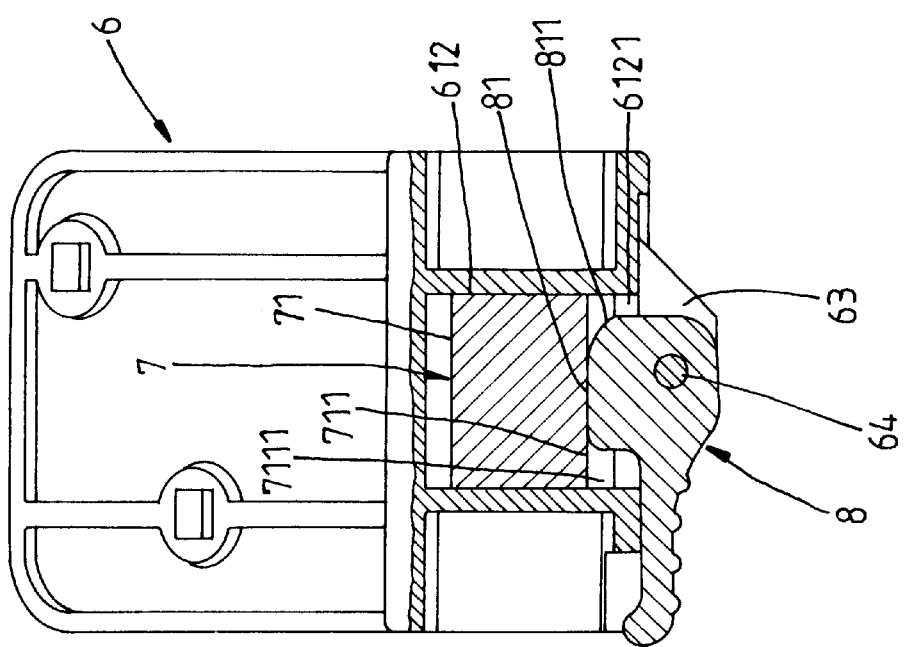
FIG. 6 is similar to FIG. 5 but showing the lever turned to the horizontal locking position.
Figure 7:
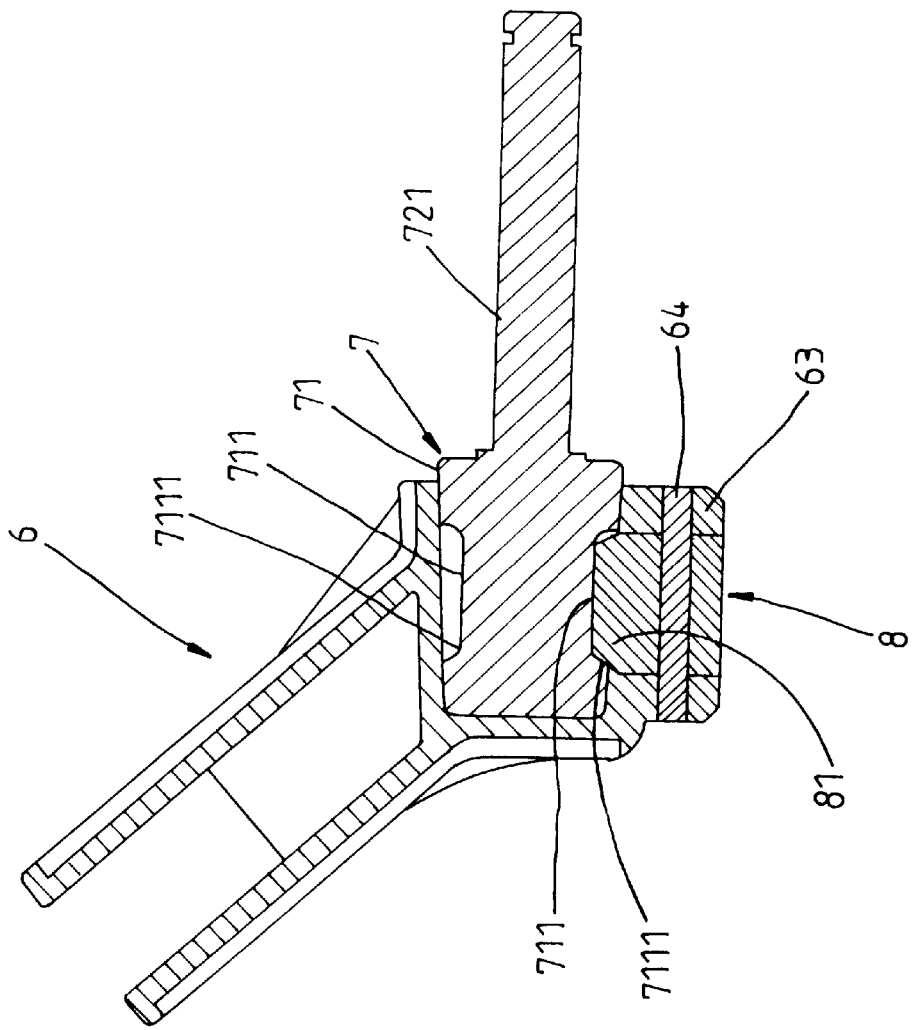
FIG. 7 is another sectional view of the present invention, showing the lever turned to the locking position, the wheel shaft locked.

Referring to Figures from 3 through 7, the present invention comprises a leg 6 provided at a golf club carrier (not shown), a wheel shaft 7 fastened to the leg 6 to hold a wheel 9, and a lever 8 pivoted to the leg 6 and turned to lock the wheel shaft 7. The leg 6 comprises a horizontal locating hole 612, a bottom insertion hole 6121 provided at the bottom side wall thereof in communication with the horizontal locating hole 612, two bottom flanges 63 downwardly extended from the bottom side wall at two opposite sides of the bottom insertion hole 6121, and a pivot 64 connected between the bottom flanges 63. The wheel shaft 7 comprises a shaft body 721, which holds the wheel 9, and a locating block 71 formed integral with one end of the shaft body 721 and fitted into the horizontal locating hole 612 on the leg 6. The locating block 71 comprises two transverse positioning grooves 711 respectively provided at the bottom and topside walls thereof. Because two transverse positioning grooves 711 are provided at the bottom and top side walls of the locating block 71, the locating block 71 can be inserted with the wheel shaft 7 into the horizontal locating hole 612 in either of two reversed positions with one transverse positioning groove 711 facing the bottom insertion hole 6121. The lever 8 is turned about the pivot 64, comprising locking block 81 formed integral with one end thereof and coupled to the pivot 64. When the lever 8 is turned about the pivot 64 to a vertical position shown in FIG. 5, the locking block 81 of the lever 8 is disengaged from the locating block 71, allowing the wheel shaft 7 to be disconnected from the leg 6. When the lever 8 is turned about the pivot 64 to a horizontal position shown in FIG. 6, the locking block 71 is forced into the insertion hole 6121 and engaged into the positioning groove 711 at the bottom sidewall of the locating block 71 to lock the wheel shaft 7.

Referring to Figures from 3 through 7 again, the pivot 64 is disposed in parallel to the wheel shaft 7, and the lever 8 is turned about the pivot 64 in direction perpendicular to the wheel shaft 7. The wheel shaft 7 comprises two guide slopes 7111 at two opposite lateral sides of each of the positioning grooves 711 for guiding the locking block 81 of the lever 8 in and out of the locking position. The locking block 81 of the lever 8 has chamfered angles or edges 811 that enable the locking block 81 to be smoothly moved with the lever 8 in and out of one positioning groove 711 at the locating block 71 of the wheel shaft 7. Further, the locating hole 612 has a diameter gradually increased toward the outside of the leg 6, (a tapered shape) and the locating block 71 has an outer diameter (or tapered shaped) fitting the inner diameter of the locating hole 612.

As indicated above, the lever 8 is turned about the pivot 64 in direction perpendicular to the wheel shaft 7, therefore the lever 8 is positively secured in place when the locking block 81 is engaged into one positioning groove 711 at the locating block 71 of the wheel shaft 7. Because the locating hole 612 has a diameter gradually increased toward the outside of the leg 6 and the locating block 71 has an outer diameter fitting the inner diameter of the locating hole 612, the locating block 71 of the wheel shaft 7 can easily be inserted into the locating hole 612. Further, the design of the guide slopes 7111 at two opposite lateral sides of each of the Positioning grooves 711 enables the locking block 81 to be smoothly moved with the lever 8 in and out of the corresponding Positioning groove 711 at the locating block 71 of the wheel shaft 7.

What is claimed is:

1. A wheel mounting arrangement comprising:
    a leg provided at a golf club carrier, said leg comprising a locating hole having an open front, a closed back and a bottom side wall, said locating hole tapering from said open front to said closed back, said bottom side wall having a bottom insertion hole communicating with said locating hole, said bottom insertion hole having two opposite sides, two bottom flanges downwardly extending from said two opposite sides of said bottom insertion hole, and a pivot extending between said bottom flanges;
    a wheel shaft fastened to said leg for holding a wheel, said wheel shaft having a shaft body holding a wheel, and a locating block integrally formed with one end of said shaft body having a tapered shape matching that of said locating hole of said leg and fitting into said locating hole of said leg, said locating block having a bottom side wall, said bottom side of said locating block including a transverse positioning groove, said transversely positioning groove including two sloping side walls; and said pivot arranged parallel to said wheel shaft, a lever pivoting about said pivot in direction perpendicular to said wheel shaft between locked and unlocked positions, said lever including a locking block pivoting with said lever;

wherein when said lever is in said locked position, said locking block extends into said bottom insertion hole of said leg and engages said transverse positioning groove of said locating block of said wheel shaft; when said lever is in said unlocked position, said locking block does not engage said transverse positioning groove of said locating block of said wheel shaft; and when said lever is pivoted from said unlocked position to said locked position, said sloping side walls of said transverse positioning groove guide said locking block of said lever into engagement with said transverse positioning groove.

2. The wheel mounting arrangement according to claim 1, wherein said locking block of said lever has chamfered edges for smoothly moving said locking block in and out of said transverse positioning groove.

* * * * *